United States Patent [19]

Kazami

[11] Patent Number: 4,998,126

[45] Date of Patent: Mar. 5, 1991

[54] AUTOMATIC FOCUS ADJUSTMENT CAMERA

[75] Inventor: Kazuyuki Kazami, Tokyo, Japan

[73] Assignee: Nikon Corporation, Tokyo, Japan

[21] Appl. No.: 430,160

[22] Filed: Nov. 1, 1989

[30] Foreign Application Priority Data

Nov. 4, 1988 [JP] Japan ................... 63-279047

[51] Int. Cl.$^5$ ............................................ G03B 13/00
[52] U.S. Cl. ................... 354/400; 354/474; 354/195.11
[58] Field of Search ................... 354/400–409, 354/465, 467, 471–475, 195.11

[56] References Cited

U.S. PATENT DOCUMENTS

| | | | |
|---|---|---|---|
| 4,652,104 | 3/1987 | Harvey | 354/106 |
| 4,678,299 | 7/1987 | Harvey | 354/21 |
| 4,678,300 | 7/1987 | Beach | 354/21 |
| 4,827,303 | 5/1989 | Tsuboi | 354/403 |

FOREIGN PATENT DOCUMENTS 61-43698  9/1986  Japan .

Primary Examiner—L. T. Hix
Assistant Examiner—David M. Gray
Attorney, Agent, or Firm—Shapiro and Shapiro

[57] ABSTRACT

An automatic focus adjustment camera in which a photo-taking lens is step-driven to one of a plurality of set positions, depending upon measurement of object distance, employs aperture adjustment or adjustment of object distance to improve resolution of images. The total focusing distance range of the photo-taking lens is divided into successive object distance ranges, and the center of each object distance range corresponds to one of the set positions of the photo-taking lens. The amount of adjustment to improve resolution is determined by the extent to which the measured object distance differs from the center of the object distance range that includes the measured object distance. In a portrait photography mode the aperture diameter is made large enough to ensure blurring of background while obtaining a sharp object image.

8 Claims, 5 Drawing Sheets

AUTOMATIC FOCUS ADJUSTMENT CAMERA

BACKGROUND OF THE INVENTION

1. Field of the Invention

This invention relates to an auto focus camera in which the focus adjustment of a photo-taking lens is effected on the basis of range finding information recording an object to be photographed.

2. Related Background Art

A lens shutter camera having a stop and shutter has heretofore adopted an exposure control system called the triangular or trapezoidal program system. In this program system, the change in aperture opening accompanying the lapse of time presents a triangular or trapezoidal shape in a graph in which aperture value and time are plotted as ordinate and abscissa, respectively. A combination of an aperture value and a shutter speed for obtaining proper exposure is determined accordingly.

In many of the focus adjusting mechanisms of lens shutter cameras, the photo-taking lens is stepdriven. In such focus adjusting mechanism, the total focusing distance range from a nearest focusing distance to the farthest focusing distance is predivided into a plurality of object distance ranges in the direction of the optic axis of the photo-taking lens. The object distance range on which an object to be photographed exists is discriminated, and the photo-taking lens is driven to the set position (the distance step position) of the photo-taking lens corresponding to the center of the discriminated distance range. When the object to be photographed lies at a position corresponding to the center of the distance range, a sharp object image is obtained, but when the object to be photographed lies at a position distant from the center of the distance range, for example, at a distance corresponding to a border position with respect to a next distance range, the object image lacks sharpness and apparently the resolving power of the photo-taking lens is reduced.

In recent years, there has been a tendency toward using two focal length lenses or zoom lenses in lens shutter cameras, and occasions in which portrait photographing is effected when the phototaking lens is changed over to the telephoto side have been increasing. In such portrait photographing, it is required that the background of the main object to be photographed be blurred and the main object to be photographed be emphasized. Therefore, it is desirable that the aperture of the lens be as fully open as possible.

However, there is a contradiction, because in portrait photographing, it is desirable that an object be photographed with a large aperture opening to blur the background, but to obtain a sharp object image, it is desirable that the object be photographed with a small aperture opening.

SUMMARY OF THE INVENTION

An object of the present invention is to provide an improved automatic focusing adjustment camera of the type in which a focusing lens is step-driven.

Another object of the invention is to provide a camera of the aforesaid type in which the resolution of images formed by a photo-taking optical system is improved by aperture adjustment or by adjustment of the object distance.

Yet another object of the invention is to provide a camera of the aforesaid type in which portrait photographing is enhanced by ensuring that the aperture is adjusted to blur the background and, at the same time, to obtain a sharp object image.

In accordance with one aspect of the invention, an automatic focus adjustment camera includes a device for measuring distance to an object to be photographed and a photo-taking optical system having an adjustable aperture and a focusing lens that is driven, depending upon measured object distance, to one of a plurality of predetermined set positions associated with predetermined object distance ranges. The camera comprises means, dependent upon the difference between a measured object distance and an object distance corresponding to the set position in an object distance range that includes the measured object distance, for determining the extent to which the aperture or the object distance should be adjusted in order to provide desired resolution of an image of the object produced by the photo-taking optical system.

DESCRIPTION OF THE PREFERRED EMBODIMENTS

Figure 1A:
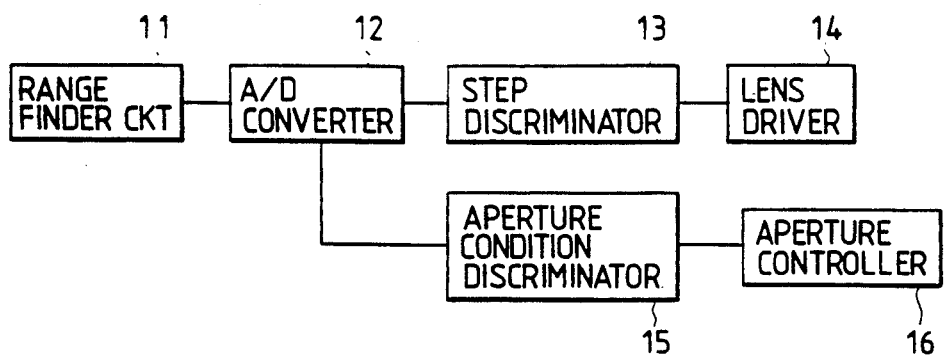
FIGS. 1A and 1B are block diagrams showing a first embodiment of the present invention.

FIG. 1A is a block diagram showing a first embodiment of the present invention.

In FIG. 1A, the reference numeral 11 designates a range finder circuit for measuring the distance to an object to be photographed in keeping with the photographing operation. The analog distance data measured by the range finder circuit 11 is input to an A/D converter 12, and is converted into digital data that is input to a step discriminator 13. The digital data corresponds to one of a plurality of range measurements steps that is determined by the object distance measured by the range finder circuit 11. The step discriminator 13 divides the total focusing distance range into a plurality of successive object distance ranges, each of which includes object distances corresponding to several measurement steps, respectively. The driving step discriminator 13 establishes a plurality of set positions to which a focusing lens (hereinafter referred to simply as the photo-taking lens) of a photo-taking optical system may be step-driven. Assuming that the number of measuring steps in the A/D converter 12 for a total focusing object distance range (the area between the farthest distance and the nearest distance to which the photo-taking lens can be focused) is sixteen and the number of driving steps in the driving step discriminator 13 is four, each four measuring steps in the A/D converter 12 are grouped together so as to constitute one driving step corresponding to a set position of the photo-taking lens thereof. Accordingly the distance range corresponding to one measuring step is narrower than the distance range corresponding to one driving step, i.e., the range finding accuracy is higher than the position setting accuracy.

When a particular driving step corresponding to the object distance is thus discriminated by the driving step discriminator 13, a lens driver 14 operates on the basis of the discriminated driving step during focus adjustment and drives the phototaking lens to the set position corresponding to the discriminated driving step. Thus, focus adjustment control is effected.

The value of the measuring step obtained in the A/D converter 12 is output to an aperture condition discriminator 15. In the aperture condition discriminator 15, the corresponding relation of the position of the photo-taking lens to the value of each measuring step set in the A/D converter 12 is preset. Accordingly, when it receives the value of a particular measuring step from the A/D converter 12, the aperture condition discriminator 15 can foresee and discriminate what degree of resolution will be obtained at the set position of the photo-taking lens driven in conformity therewith. If the resolution discriminated by the aperture condition discriminator 15 is not proper, an aperture controller 16 effects stop-down control on the basis of the result of the discrimination by the aperture condition discriminator 15 so that there is provided an aperture value for which a desired resolution is obtained.

Figure 1B:
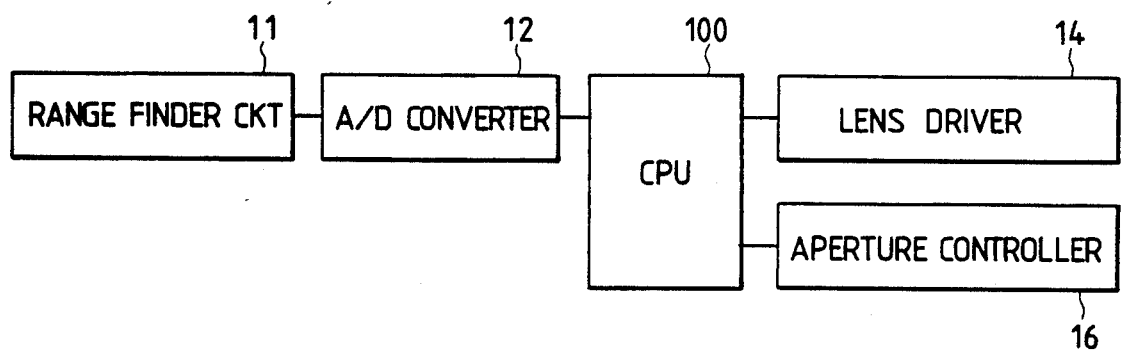

FIG. 1B shows a block diagram when a CPU 100 performs the roles of the driving step discriminator 13 and the aperture condition discriminator 15 of FIG. 1A.

Figure 2:
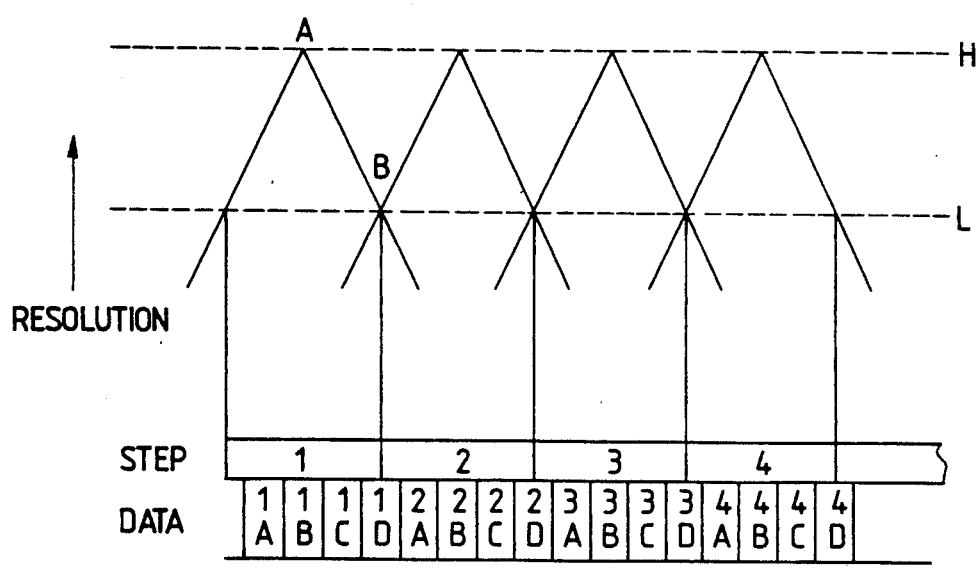
FIG. 2 is an illustration showing the relation among the driving step of the photo-taking lens in FIG. 1, the measuring step of an A/D converter and the apparent resolution of the photo-taking lens.

FIG. 2 is an illustration showing the resolution for the driving steps for the driving of the photo-taking lens in the automatic focus adjustment control of FIG. 1, and shows the measuring steps by the A/D converter 12 set more finely than the driving steps.

In FIG. 2, four distance data (DATA) of the measuring steps provided by the A/D converter 12 are assigned to each of driving steps 1-4 for driving the photo-taking lens (which, for example, is focused to a more distant object to be photographed as the numerical value becomes greater). Also, the resolution in each of the driving steps 1-4 for driving the photo-taking lens is highest resolution H at the center of each driving step, and is the lowest resolution L at a boarder of each driving step.

For example, in the distance data 1B included in the step 1, the highest resolution H is obtained at a point A on the line indicative of the resolution, because the object to be photographed lies near the center of the object distance range corresponding to step 1. In the distance data 1D a the boarder between the step 1 and the step 2, the lowest resolution L is obtained at a point B, because the object to be photographed lies at a position farthest from the vicinity of the center of the object distance range corresponding to step 1.

The resolution shown in FIG. 2 can be improved by stepping down an aperture. For example, if the aperture is stopped down by two steps relative to the resolution in the fully open aperture, the resolution can be increased generally by a factor of two. Accordingly, in the present invention, exposure control with importance attached to the resolution is effected by the utilization of the characteristic of the resolving power of the photo-taking lens corresponding to aperture control.

Figure 3:
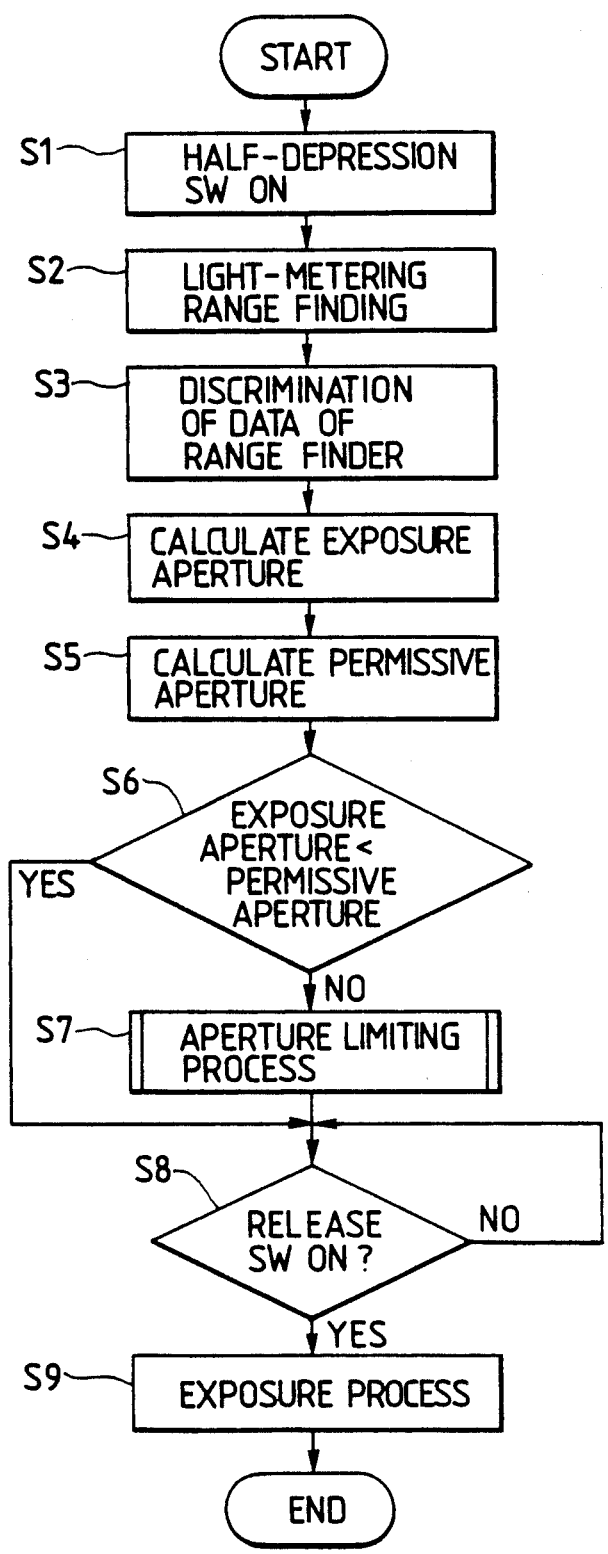
FIG. 3 is a flow chart showing the control process of the embodiment of FIG. 1.

FIG. 3 is a flow chart showing a process using the CPU 100 of FIG. 1B.

In FIG. 3, when at step S1, a half-depression switch SW is closed by the half-depression of a release button (not shown), light-metering and range finding Operations are performed at step S2.

Subsequently, at step S3, discrimination of the distance data in the A/D converter 12 is effected. That is, the analog distance data obtained in the range finder circuit 11 is converted into digital distance data of a measuring step.

Advance is then made to step S4, where an aperture value for which proper exposure is obtained is calculated as an exposure aperture value from the result of the light-metering obtained at the step S2.

Next, at step S5, a permissive aperture value is calculated. This permissive aperture value is the aperture value of the photo-taking lens predetermined correspondingly to the distance data of the measuring step discriminated at the step S3 to obtain a desired resolution for the object to be photographed. For example, in FIG. 2, if the distance data 1B indicative of the fact that the object to be photographed lies in the central portion of the object distance range of the step 1 is obtained by the distance data discrimination of the step S3, the fully open aperture value is calculated, and if the distance data 1C indicative of the fact that the object to be photographed lies at a position one step away from the central portion of the object distance range of the step 1 of FIG. 2 is obtained, an aperture value stopped down by one step relative to the fully open aperture value is calculated, and further, if the distance data 1D indicative of the fact that the object to be photographed lies at a position farthest from the central portion of the object distance range of the step 1 of FIG. 2, i.e., a position two steps away from said central portion, is obtained. An aperture value stopped down by two steps relative to the fully open aperture value is calculated.

Subsequently, shift is made to step S6, where the exposure aperture value for obtaining proper exposure obtained at the step S4 is compared with the permissive aperture value for obtaining the desired resolution obtained at the step S5. If the exposure aperture value (F-number) is greater than the permissive aperture value (that is, if the aperture opening corresponding to the exposure aperture value is smaller than the aperture opening corresponding to the permissive aperture value), the exposure aperture value is set and advance is made to step S8. Then, when at the step S8, the closing of the release switch by the full depression of the release button (not shown) is discriminated, advance is made to step S9, where the photographing operation is performed by exposure control for setting the aperture opening to the set exposure aperture value.

On the other hand, if at the step S6, it is judged that the exposure aperture value is greater than the permissive aperture value, the required resolution is not obtained with the exposure aperture value obtained from photographic conditions. Accordingly, in such case, advance is made to the aperture limiting process of step S7 to adopt the permissive aperture value calculated at the step S5.

In the aperture limiting process of the step S7, the aperture value is set to the permissive aperture value for obtaining the resolution calculated at the step S5, and the shutter time is lengthened by an amount corresponding to the difference between the exposure aperture value and the permissive aperture value, thereby preventing underexposure. Where underexposure cannot be prevented by the adjustment using such shutter time, application of auxiliary light by a flash unit is effected and an exposure process at the permissive aperture value is effected.

After the step S7, advance is made to step S8, where the closing of the release switch is waited for, and advance is made to the exposure process of step S9.

Figure 4A:
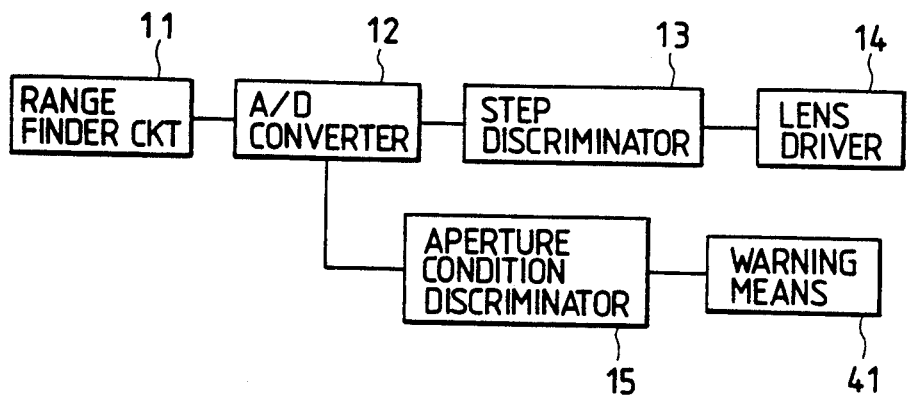
FIGS. 4A and 4B are block diagrams showing a second embodiment of the present invention.

FIG. 4A is a block diagram showing another embodiment of the present invention, and this embodiment is characterized in that when it is discriminated that the object distance corresponding to the measuring step detected by the range finding means and the center of the driving step (the object distance range) of the photo-taking lens do not coincide with each other or deviate greatly from each other, the aperture itself is not corrected but the object distance, which is another factor for obtaining the desired resolution, is manipulated.

In FIG. 4A, the range finder circuit 11, the A/D converter 12, the distance step discriminator 13, the lens driver 14 and the aperture condition discriminator 15 are the same as those in the embodiment of FIG. 1A, but the aperture controller 16 is absent. When it is discriminated by the aperture condition discriminator 15 that the distance data from the A/D converter 12 and the center of the driving step (the object distance range) corresponding to the set position of the photo-taking lens do not coincide with each other, warning means 41 is activated (instead of the aperture controller 16) calling for movement so as to bring the object distance into coincidence with the center of the driving step to which the photo-taking lens is set.

Figure 4B:
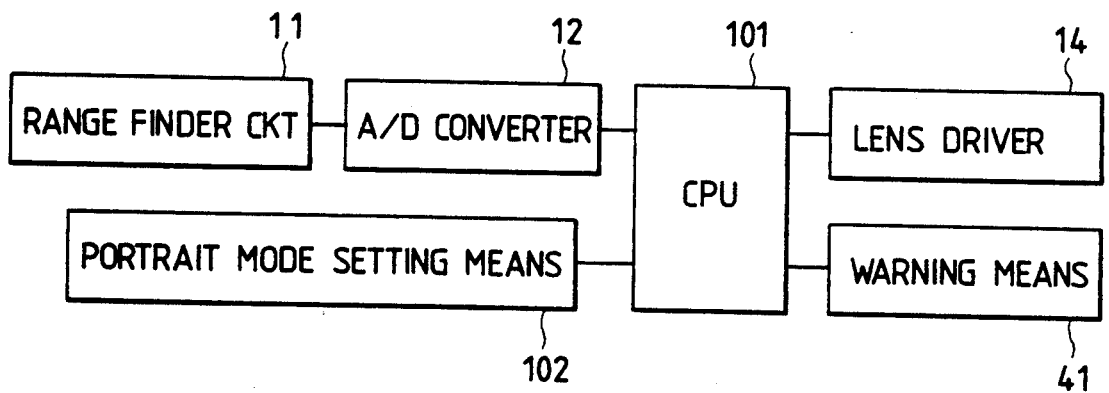

FIG. 4B shows a block diagram when a CPU 101 performs the roles of the driving step discriminator 13 and the aperture condition discriminator 15 of FIG. 4A. Portrait mode setting means 102 which will be described later is connected to the CPU 101.

Figure 5:
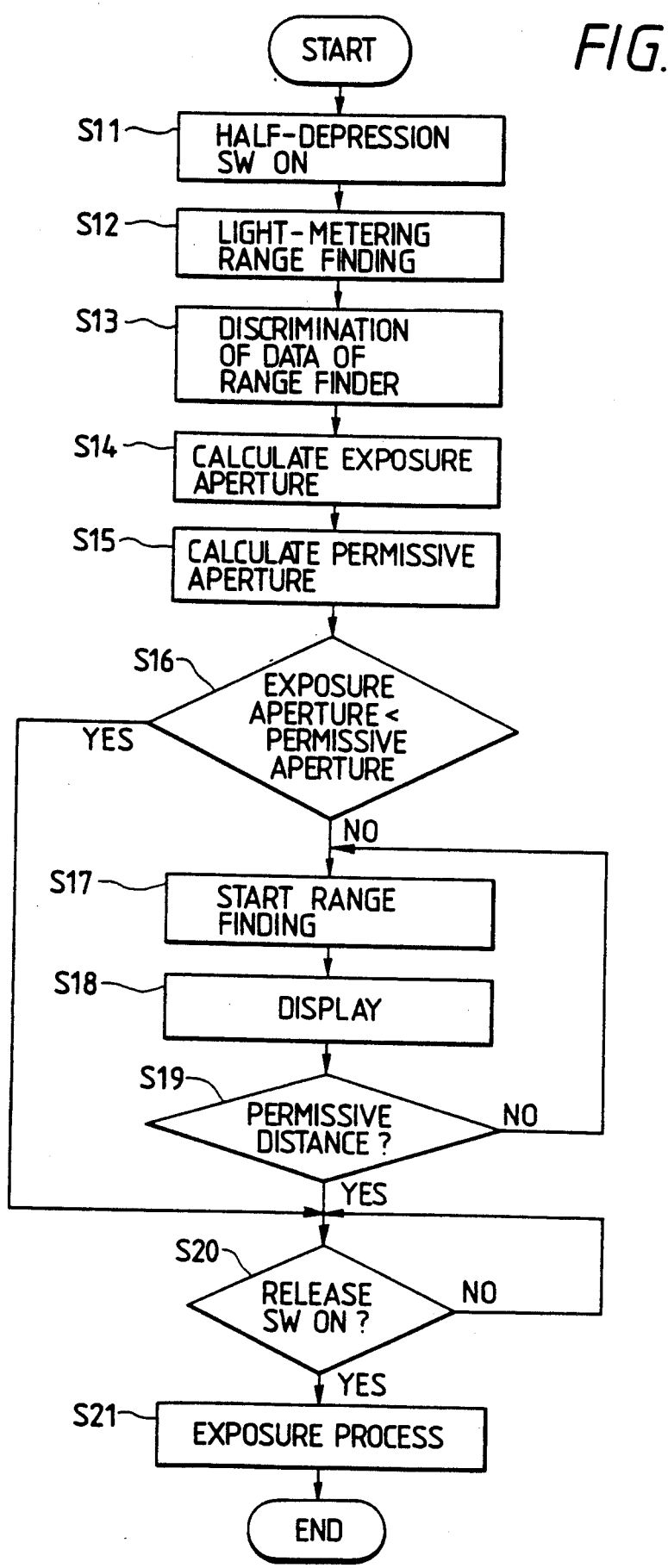
FIG. 5 is a flow chart showing the control process of the second embodiment.

FIG. 5 is a flow chart showing a control process using the CPU 101 in the embodiment of FIG. 4B. The process of steps S11–S15 is the same as the steps S1–S5 of the flow chart of FIG. 3.

If at step S16, the exposure aperture value for exposure control based on a preset or calculated aperture value is smaller than the aperture of the permissive aperture value for obtaining the desired resolution, advance is made to step S20, where the closing of the release switch is activated and the photographing operation is effected by the exposure process of step S21.

On the other hand, if at the step S16, the exposure aperture value is greater than the aperture of the permissive aperture value for obtaining the desired resolution, the desired resolution cannot be obtained at the then object distance and accordingly, in this case, advance is made to step S17, where the range finding operation by the range finder circuit 11 is resumed, and at step S18, a message display is effected by the warning means 41 calling for movement for bringing the object distance into coincidence with the center of the driving step (the object distance range) corresponding to the set position of the photo-taking lens which is being step-driven at this time.

For example, assuming that the photo-taking lens is driven by the step 1 of FIG. 2 and lies at a set position corresponding to the distance data 1B and at this time, the actual distance data is, for example, the distance data 1D which provides the change-over point between the step 1 and the step 2, at step S18, a message is displayed by the warning means 41 to the effect that the photographer should get nearer to the object to be photographed.

Subsequently, at step S19, whether the distance data from the range finder circuit 11 has coincides with the permissive distance, that is, coincides with the center of the driving step (in the previous example, the distance data 1B) corresponding to the set position of the photo-taking lens, is discriminated and the process of steps S17–S19 is repeated until the two coincide.

When at the step S19, it is discriminated that the measured object distance has coincides with the center of the driving step (the object distance range) of the photo-taking lens, advance is made to step S20, where the closing of the release switch is awaited and the photographing operation by the exposure process of step S21 is performed.

Figure 6:
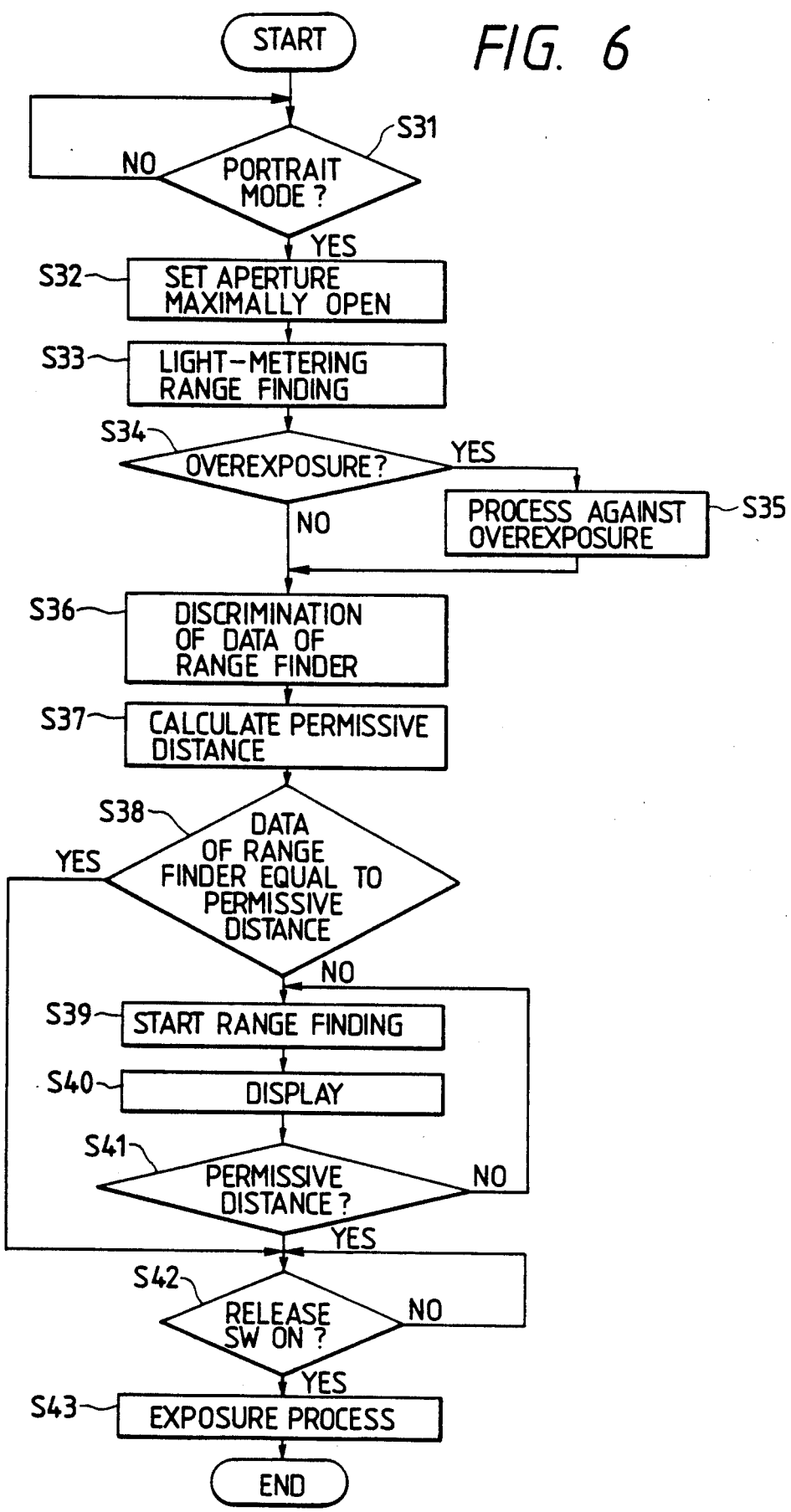
FIG. 6 is a flow chart showing another control process of the second embodiment.

FIG. 6 is a flow chart of a control process in which, as another control process of FIG. 4B, a portrait mode in which the main object to be photographed is sharply focused and the background thereof can be blurred is carried out.

In FIG. 6, at step S31, the presence or absence of the setting of the portrait mode by the portrait mode setting means 102 of FIG. 4B is checked.

This portrait mode setting means 102 effects the setting of the portrait mode in conformity with the operation of a mode setting switch, the tele mode setting of a two-focal length lens or a zoom lens to the tele side, and further the selection of a trimming mode (the pseudo tele mode). The trimming mode is described in Japanese Patent Publication No. 61-43698, U.S. Pat. Nos. 4,652,104, 4,678,299 and 4,678,300. In a camera provided with such a trimming mode, during photographing, trimming data is imprinted on a film, and during the printing of the film, the trimming data is detected to thereby automatically prepare trimmed photographs, i.e., pseudo tele prints.

When at step S31, the portrait mode is discriminated, advance is made to step S32, where the maximally open aperture setting for setting the aperture to the greatest aperture is effected for the purpose of portrait photographing, i.e., to blur the background of the main object to be photographed.

Subsequently, at step S33, the light-metering and range finding operations are performed. At the step S33, the calculation of the exposure aperture value based on the light-metering data is effected simultaneously.

At the next step S34, the presence or absence of overexposure is checked with respect to the maximally open aperture value set at the step S32.

In the case of overexposure, at step S35, for example, a warning of overexposure is given or the shutter time is shortened to make the exposure proper.

Subsequently, at step S36, the distance data is discriminated as at the steps S3 and S13 of FIGS. 3 and 5.

Shift is then made to step S37, where the permissive distance data for obtaining the desired resolution (the distance data corresponding to the central portion in the driving step of the photo-taking lens found on the basis of the analog distance data from the range finder circuit 11, and for example, in the driving step 1 of the photo-taking lens shown in FIG. 2, the distance data 1B) is calculated, and advance is made to step S38.

At the step S38, the distance data at the step S33 and the permissive distance data at the step S37 are compared with each other.

If at the step S38, the distance data at the step S33 is equal to the permissive distance data at the step S37, advance is made to step S42, where the closing of the release switch is awaited and advance is made to the exposure process of step S43.

On the other hand, if it is judged at the step S38 that the distance data at the step S33 differs from the permissive distance data at the step S37 (for example, the distance data is 1D and the permissive distance data is 1B), the main object to be photographed cannot be sharply focused depending on the distance data at the step S33. So, advance is made to step S39, where the range finding operation is performed again.

At the next step S40, a message is displayed by warning means 41 calling movement of the photo-taking lens to bring the object distance into coihcidence with the permissive distance (the center of the driving step corresponding to the set position of the phototaking lens), and advance is made to step S41.

If at the step S41, the coincidence between the permissive distance data obtained at the step S37 and the distance data obtained at the step S39 is discriminated, advance is made to step S42, where the closing of the release switch is awaited for and advance is made to the exposure process of step S43.

In the photographing operation wherein the portrait mode of FIG. 6 is set, a process, in which the resolution necessary for portrait photographing is obtained, as in FIG. 5, by changing the distance 1 between the camera and the object to be photographed has been taken as an example, but of course, aperture value control shown in FIG. 3 may be effected.

As has hitherto been described, according to the present embodiment, when the center of the driving step (the object distance range) of the photo-taking lens and the object distance corresponding to the measuring step determined by the range finding means do not coincide with each other, the photo-taking lens is stopped down so as to assume an aperture value which provides a proper resolution corresponding to the object distance, or or a display is effected for calling movement so as to bring the object distance into coincidence with the center of the driving step of the photo-taking lens. Therefore, even in an auto focus camera in which the photo-taking lens is driven in coarse driving steps, a photographing operation with importance attached to the resolution can be performed. Particularly, in a embodiment wherein photographing in the portrait mode is possible, a portrait picture in which the main object to be photographed is sharply imaged and the background thereof is reliably blurred can be simply taken.

I claim:

1. An automatic focus adjustment camera including a device for measuring distance to an object to be photographed and a photo-taking optical system having an adjustable aperture and a focusing lens that is driven, depending upon measured object distance, to one of a plurality of predetermined set positions associated with predetermined object distance ranges, the camera comprising means, dependent upon the difference between a measured object distance and an object distance corresponding to the set position in an object distance range that includes the measured object distance, for determining the extent to which the aperture or the object distance should be adjusted in order to provide desired resolution of an image of the object produced by the photo-taking optical system.

2. An automatic focus adjustment camera according to claim 1, wherein said determining means produces a warning indicating the need for adjusting the object distance upon determining that said difference is substantial.

3. An automatic focus adjustment camera according to claim 1, wherein said measurement device produces one of a plurality of measuring steps, each measuring step designating an object distance, and each of said object distance ranges including a plurality of said measuring steps, each set position of said focusing lens corresponding to an object distance substantially at the center of the associated object distance range, the resolution of images produces by said photo-taking optical system being highest for an object distance at the center of an object distance range and being lowest for an object distance at a border of an object distance range.

4. An automatic focus adjustment camera according to claim 1, wherein said determining means comprises means for comparing an aperture opening selected in accordance with photographic conditions with an aperture opening calculated to provide a desired image resolution, and further comprising means for adjusting the aperture to one or the other of said aperture openings in accordance with a result of the comparing.

5. An automatic focus adjustment camera according to claim 4, wherein said adjusting means adjusts the aperture to said calculated aperture opening when the calculated aperture opening is smaller than said aperture opening selected in accordance with photographic conditions and adjusts the aperture to said aperture opening selected in accordance with photographic conditions when the calculated aperture opening is not smaller than the aperture opening selected in accordance with photographic conditions.

6. An automatic focus adjustment camera according to claim 5, wherein the calculated aperture opening depends upon the aforesaid difference.

7. An automatic focus adjustment camera according to claim 1, wherein the camera has a portrait photography mode in which a large aperture opening is employed and wherein the determining means produces an output for initiating adjustment of the aperture to a smaller aperture opening or for initiating adjustment of the object distance, depending upon whether the object distance measured by the measuring device is substantially the same as or differs from an object distance corresponding to the center of an object distance range that includes the measured object distance 8. An automatic focus adjustment camera according to claim 1, wherein each of said set positions corresponds to an object distance substantially at the center of the associated object distance range, said object distance ranges divide a total focusing range of said focusing lens into successive object distance ranges, said distance measuring device categorizes the measured object distance in one of a plurality of object distance measuring steps, each of said object distance ranges includes several of said object distance measuring steps, and said determining means produces an output that depends upon the difference between an object distance corresponding to a set position to which said focusing lens is driven and a measuring step corresponding to a measured object distance within the object distance range associated with the last-mentioned set position.

* * * * *